United States Patent
Lin et al.

(10) Patent No.: US 6,535,126 B2
(45) Date of Patent: Mar. 18, 2003

(54) ELECTROCHROMIC TRANSPARENCY INCORPORATING SECURITY SYSTEM

(75) Inventors: Chia Cheng Lin, Allison Park, PA (US); Thomas G. Rukavina, Verona, PA (US); Yu Jiao, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 13 days.

(21) Appl. No.: 09/738,306

(22) Filed: Dec. 15, 2000

(65) Prior Publication Data

US 2002/0021481 A1 Feb. 21, 2002

(51) Int. Cl.$^7$ ............................................. G08B 13/00
(52) U.S. Cl. ..................... 340/550; 340/545.4; 359/269; 359/273
(58) Field of Search ................................ 340/550, 540, 340/545.1, 545.4; 359/601–610, 267–273

(56) References Cited

U.S. PATENT DOCUMENTS

| 1,223,583 | A | | 4/1917 | Hitchcock | |
|---|---|---|---|---|---|
| 3,409,886 | A | | 11/1968 | Davis et al. | 340/273 |
| 3,441,925 | A | | 4/1969 | White | 340/274 |
| 3,825,920 | A | * | 7/1974 | Nelson et al. | 340/550 |
| 3,947,837 | A | | 3/1976 | Bitterice | 340/274 R |
| RE33,343 | E | | 9/1990 | Bitter et al. | 219/509 |
| 4,972,176 | A | * | 11/1990 | Vallance | 340/550 |
| 5,340,503 | A | * | 8/1994 | Varaprasad et al. | 252/583 |
| 5,608,995 | A | | 3/1997 | Borden | 52/171.3 |
| 5,724,187 | A | * | 3/1998 | Varaprasad et al. | 359/608 |
| 5,802,783 | A | * | 9/1998 | Bayha | 52/204.5 |
| 5,989,717 | A | * | 11/1999 | Allemand et al. | 428/426 |
| 6,143,209 | A | * | 11/2000 | Lynam | 252/583 |
| 6,239,898 | B1 | * | 5/2001 | Byker et al. | 359/265 |

FOREIGN PATENT DOCUMENTS

EP          0 419 848          4/1991

OTHER PUBLICATIONS

Lampert, C. M., *Smart switchable glazing for solar energy and daylight control*, "Solar Energy Materials and Solar Cells" 52 (1998) pp. 207–221.

* cited by examiner

*Primary Examiner*—Toan Pham
(74) *Attorney, Agent, or Firm*—Andrew C. Siminerio; Kenneth J. Stachel

(57) ABSTRACT

An electrochromic window assembly includes a security system for monitoring breakage of the electrochromic window assembly. Control circuitry is connected to the electrochromic window assembly for monitoring an electrical characteristic of one or more conductive coatings within the electrochromic window assembly, such as electrical resistance. Upon detecting a change in the electrical resistance, such as that caused by a break in one or more conductive coating, an alarm signal is generated and is sent to an alarm trigger circuit for activating an alarm. A method for monitoring penetration or breakage of an electrochromic window assembly is also provided, which method involves applying electrical activation to an electrochromic assembly and monitoring for a change in an electrical characteristic based on the applied electrical potential. Electrochromic window assemblies incorporating security alarm features in accordance with the present invention are particularly useful in automobile applications.

32 Claims, 7 Drawing Sheets

ELECTROCHROMIC TRANSPARENCY INCORPORATING SECURITY SYSTEM

FIELD OF THE INVENTION

The present invention relates to electrochromic devices incorporating a security system. More particularly, the present invention relates to electrochromic devices particularly useful as transparencies which include a security feature to detect breakage of the transparency.

DESCRIPTION OF TECHNICAL CONSIDERATIONS

Electrochromic devices are well-known in the art for use in various applications. Such electrochromic devices typically include a sealed chamber defined by two pieces of glass which are separated by a gap or space which contains an electrochromic medium. The electrochromic medium typically includes anodic compounds and cathodic compounds together in a solution. The glass substrates typically can include transparent conductive layers coated on facing surfaces of the glass and in contact with the electrochromic medium. The conductive layers on both glass substrates are connected to electronic circuitry. When the conductive layers are electrically energized, an applied potential is introduced into the chamber of the device which electrically energizes the electrochromic medium and causes the medium to change color. For example, when the electrochromic medium is energized, it may darken and begin to absorb light.

Electrochromic devices are used in rear-view mirror assemblies in automotive applications. In such uses, a photocell can be incorporated into the electrochromic cell to detect a change in light reflected by the mirror. When a specific level of light is reflected, for instance when lights are reflected at night, the photocell can activate to apply an electrical potential to the electrodes in the cell, thus causing the electrochemical medium to change color and create a darkening effect, thereby dimming the mirror to the lights. Additionally electrochromic devices have been proposed for use in other automotive applications, such as windshields and windows, as well as other window transparency applications, such as aircraft window assemblies and architectural windows.

Security alarm systems for conventional windows are known, and such conventional alarms typically include a frangible conductor, such as a foil tape or thin wire, typically in a serpentine or circumscribing path, affixed to the window glazing and through which an electric current is passed. When the window is broken, the conductor also breaks thereby opening the circuit and triggering an alarm. A typical system employing thin wires may be seen in U.S. Pat. No. 1,223,583, and a typical system employing foil tape may be seen in U.S. Pat. No. 3,409,886. Moreover, transparent conductive coatings can be utilized in such window glazings for passing current through the entire window area, such as set forth in U.S. Pat. No. 3,441,925. U.S. Pat. No. 3,947,837 provides a window glazing including a grid of fine wires which permits resetting of the grid after a partial break occurs. U.S. Pat. No. Re. 33,343 provides a crack detector for an electrically conductive windshield which monitors the windshield to determine a change in the conductance of the windshield due to a break in the windshield and interrupts power to the conductive panel in the event of such a break.

An object of the present invention is providing electrochromic devices which are useful in window assemblies, which can be easily manufactured and which provide security features.

SUMMARY OF THE INVENTION

The present invention is directed to an electrochromic security window assembly capable of reduced light transmittance upon application of electrical potential thereto and which includes a security alarm system which is capable of detecting a break in the window assembly. The window assembly includes first and second spaced transparent substrates defining a chamber therebetween. Both of the first and second substrates include first and second conductive coatings on respective facing surfaces thereof, and means for applying electrical potential to the first and second conductive coatings. An electrochromic medium having reduced light transmittance upon application of electrical activation like an electrical potential thereto is contained within this chamber. The electrochromic medium, which can be a solution, gel, polymer or polymers, preferably includes at least one anodic electrochromic compound and at least one cathodic electrochromic compound. At least one of the anodic and cathodic electrochromic compound is a dye. Preferably, the cathodic electrochromic compound is a viologen compound and the anodic electrochromic compound is a phenazine compound.

The assembly further includes circuit means connected to at least one of the first and second conductive coatings, which is capable of detecting a change in an electrical characteristic of the at least one conductive coating connected thereto, and for generating an output signal in response to a change in the electrical characteristic. Such a change in electrical characteristic, such as a change in the resistance or current flow through the circuit, corresponds to a break in the at least one conductive coating.

Preferably, the means for detecting the change in the electrical characteristic detects a change in current through the at least one conductive coating. The electrical potential applied to the at least one conductive coating is adjustable. The potential can be between a voltage below the reduction potential capable of simultaneously oxidizing the anodic electrochromic compound and reducing the cathodic electrochromic compound when the window assembly is in a state of increased light transmittance and a voltage above the reduction potential capable of simultaneously oxidizing the anodic electrochromic compound and reducing the cathodic electrochromic compound when the window assembly is in a state of reduced light transmittance or is in a transition from a state of increased light transmittance to a state of reduced light transmittance. The security alarm feature can be activated when the electrochromic window assembly is in a clear state or a darkened state, or in a transition period between the clear state and the fully darkened state. Alternatively, the electrical potential can be intermittently applied to the at least one conductive coating connected to the circuit means at a voltage above and below the reduction potential capable of simultaneously oxidizing the anodic electrochromic compound and reducing the cathodic electrochromic compound, thereby providing a pulsing type current flow.

In a further embodiment, the electrochromic window assembly includes an electrical potential applicator or means for alternately applying the electrical potential: (i) between the first and second conductive coatings at a voltage above the reduction potential capable of simultaneously oxidizing the anodic electrochromic compound and reducing the cathodic electrochromic compound when the window assembly is in a state of reduced light transmittance; and (ii) the at least one conductive coating connected to the circuit means at a voltage capable of detecting a change in the electrical characteristic. Such an arrangement also involves an intermittent pulsing of the current when the window assembly is in the darkened state.

In a further embodiment, a method for monitoring penetration or breakage of a window assembly which is capable of variable light transmittance is provided. In the method, an electrical characteristic of the at least one conductive coating having the electrical potential applied thereto as described above is monitored for a change in the electrical characteristic. Upon detecting a change, an output signal is generated and is sent, for example, to an alarm and/or a global positioning system (GPS).

Preferably, the monitoring of the change in the electrical characteristic includes monitoring a change in current through at least one conductive coating.

BRIEF DESCRIPTION OF THE DRAWINGS

FIG. 3a is a schematic diagram of one embodiment of the electrochromic security window assembly of the present invention;

FIG. 3b is a circuit diagram of the voltage level detector of FIG. 3a;

DETAILED DESCRIPTION OF THE PREFERRED EMBODIMENTS

Figure 1:
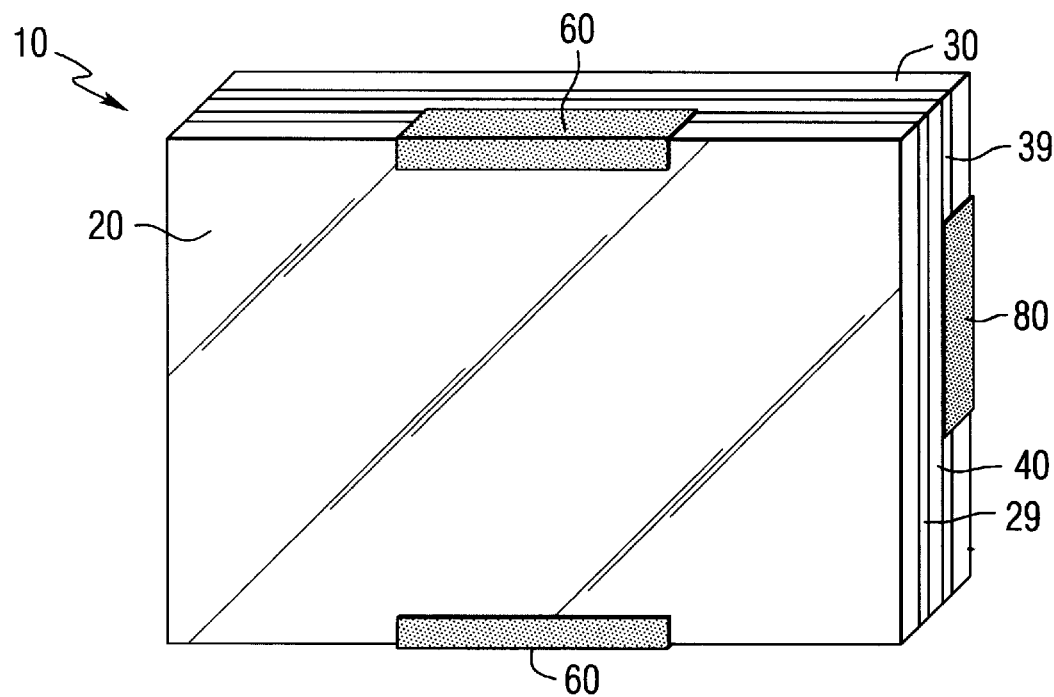
FIG. 1 is a perspective view of an electrochromic window assembly used in connection with the present invention.

As indicated, the present invention is directed to an electrochromic window assembly including a security system for monitoring breakage of the window assembly. The assembly includes control circuitry which is connected to an electrochromic window assembly, and which monitors an electrical characteristic, such as the electrical current across or resistance of conductive coatings within the electrochromic window assembly. Upon detecting a change in the electrical resistance, such as that caused by a break in the conductive coating, an alarm and/or GPS signal is generated and is sent to an alarm and/or GPS trigger circuit for activating an alarm and/or GPS signal. Electrochromic window assemblies incorporating security alarm features in accordance with the present invention are particularly useful in automotive applications.

In the following description, like elements bear like reference numerals. Moreover, reference to outer or inner is to be understood as reference with respect to the external environment, such as an outer surface being a surface closest to the external environment and an inner surface being a surface opposite that of the external environment or surface closest to the internal environment, such as the interior of an automobile or building.

Referring generally to FIGS. 1–3b, electrochromic window assembly 10 is depicted. The size and shape of electrochromic window assembly 10 can be selected according to the particularly desired use of the assembly. For example, electrochromic window assembly 10 may have a symmetrical geometry, such as a square, circular, oval, elliptical, polygonal, or rectangular shaped window assembly. Such symmetrical shaped window assemblies are particularly useful as architectural and automotive glazings, such as windows for buildings and buses and cars. Alternatively, electrochromic window assembly 10 may include a non-symmetric geometry, such as an assembly for use as an automobile side window.

Electrochromic window assembly 10 includes first transparent substrate 20 and second transparent substrate 30. Such substrates 20, 30 may be made of any material known in the art for use in electrochromic devices. For example, such substrates 20, 30 may be made from polymeric materials, such as cast acrylics, stretched acrylic, polyurethanes and polycarbonates; glass; metal; and the like. Preferably, at least one or both of first substrate 20 and second substrate 30 are transparent over a major portion of the window assembly and are made of glass, more preferably, float glass. The major portion is that which can allow on the marginal areas of the transparency for framing of any sort such as sashes and coatings that may hide underlying circuitry. The reference to the substrates as "first" and "second" is merely for ease of description and as such is not intended to convey any technical significance.

Moreover, first substrate 20 and second substrate 30 are preferably both transparent. For purposes of the present invention, transparency is defined by a material having a luminous transmittance of at least 60%. Additionally, one or both of first and second substrates 20 and 30 may be colored or tinted.

Figure 8:
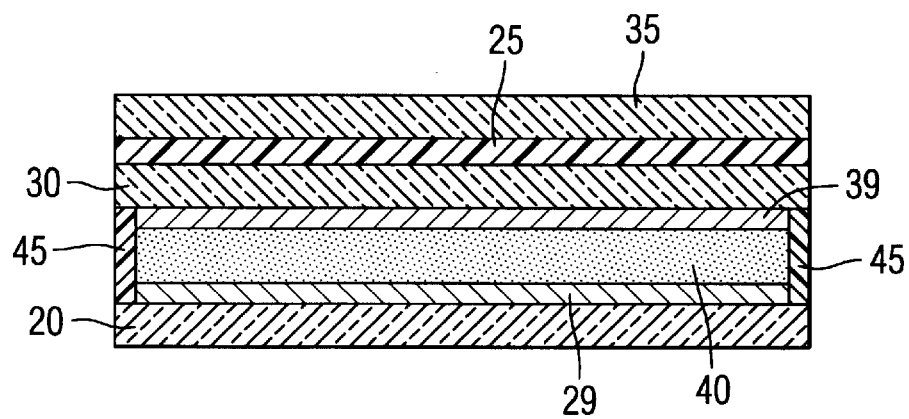
FIG. 8 is a cross-sectional view of an electrochromic window assembly in accordance with one embodiment of the present invention.

Electrochromic window assembly 10 may further include a layer 25, provided on an outer surface of first substrate 20 or second substrate 30, as depicted in FIG. 8. A suitable polymeric layer 25 may be any polymeric material known in window and glass applications. For example, polymeric layer 25 may be polyvinyl butyral (PVB). Further, layer 25 may be provided for a number of purposes or functions. For example, layer 25 may comprise a polymeric and/or inorganic film which absorbs UV light, thereby providing an effective UV window assembly. A polymeric layer 25 may also be an anti-lacerative layer. The layer 25 may also be functional layer to provide hydrophobicity or hydrophilicity to the substrate. Preferably, a third substrate 35 as shown in FIG. 8 is further provided as an external surface, with polymeric layer 25 sandwiched between first substrate 20 and third substrate 35. Third substrate 35 may be selected from the same materials as first and second substrates 20 and 30, and may be the same or different than the first and second substrates 20, 30 in any particular assembly.

First substrate 20 and second substrate 30 are spaced-apart and in a substantially parallel facing relationship with respect to each other, defining a chamber therebetween. For purposes of the present invention, substantially parallel refers to the first and second substrates 20, 30 being spaced within 5% of parallel with respect to each other. Such a relationship is preferably achieved through spacing element 45 as shown in FIG. 8. Spacing element 45 may be positioned in any manner capable of maintaining proper spacing between first substrate 20 and second substrate 30. Preferably, spacing element 45 extends parimetrically about electrochromic window assembly 10 adjacent the outer edges of first substrate 20 and second substrate 30 in a sealing manner, as is known in the art. Spacing element 45 may be positioned slightly inward from the outer edges of first substrate 20 and second substrate 30. Such positioning can provide a slight overhang of the first and second substrates 20, 30, which can expose a portion of first and second conductive coatings 29 and 39, as is known in the art for improved electrical contact. Spacing element 45 may be constructed of any material, and is preferably polymeric material. Most preferably, spacing element 45 is a curable organic polymeric material, such as a thermoplastic, thermosetting, or UV curing resin material. Epoxy-based organic sealing materials are particularly useful as spacing element 45.

First substrate 20 and second substrate 30 are each provided with a layer of a transparent electrically conductive material in the form of first conductive coating 29 and second conductive coating 39, respectively, on facing surfaces thereof. First and second conductive coatings 29 and 39 may be any material that is substantially transparent to visible light, bonds well to the substrate surfaces, is resistant to corrosion by any materials within the electrochromic device as well as the atmosphere, and has good electrical conductance. First and second conductive coatings 29 and 39 may be constructed from the same or different materials, including, for example, tin oxide, indium tin oxide (ITO), fluorine doped tin oxide (FTO), antimony doped tin oxide, ITO/metal/ITO (IMI), as well as any other materials known in the art.

First and second conductive coatings 29 and 39 may include a plurality of layers, films, or multiple coatings to form first and second conductive coatings 29 and 39, respectively. For example, first and second conductive coatings 29, 39 may include multiple layers of film deposited from pyrolytic, vapor deposition, or sputtering deposition like magnetron sputtering vapor deposition (MSVD) processes or any combinations thereof to form a composite coating.

First and second conductive coatings 29 and 39 preferably have a sheet resistance of between about 1 and about 10 ohms per square inch (about 0.155 ohms per square centimeter to about 1.55 ohms per square centimeter), preferably between about 2 to 5 ohms per square inch (about 0.31 to 0.775 ohms per square centimeter). Further, the thickness of first and second conductive coatings 29 and 39 may be the same or different relative to each other. Preferably, the thickness of first and second conductive coatings 29 and 39 is the same, and is substantially uniform, preferably between about 5,000 Å and about 50,000 Å in thickness, more preferably between about 10,000 Å and about 26,000 Å in thickness.

Electrochromic medium 40 is contained within the chamber formed between first substrate 20 and second substrate 30. Electrochromic medium 40 may be any type of material as is known in the art, and may be in any known form, for example, electrochromic solutions, liquids, gels, semi-solid, and/or polymeric materials, and the like. Electrochromic medium 40 includes a dye which defines a color. Such materials are well-known in the art to color to successively darker colors or shades as larger voltages are applied above a predetermined threshold voltage. When voltage is turned off or shorted, the coloring is bleached, allowing full transmittance of light through electrochromic medium 40.

Electrochromic medium 40 may be a solid or solution-phase type electrochromic medium, as with a material that is dissolved in solution like an ionically conducting electrolyte remaining in solution in the electrolyte when electrochemically reduced or oxidized (including a gel). Electrochromic medium 40 may alternatively be a surface-confined electrochromic medium like a solid, in which a material which is attached directly to an electronically conducting electrode or confined in close proximity thereto remains attached or confined when electrochemically reduced or oxidized. Alternatively, electrochromic medium 40 may be an electrodeposition-type electrochromic medium, in which a material contained in solution in the ionically conducting electrolyte forms a layer on the electronically conducting electrode when electrochemically reduced or oxidized.

Electrochromic medium 40 preferably includes at least two compounds, including at least one anodic electrochromic compound and at least one cathodic electrochromic compound, with the anodic compound representing an oxidizable material and the cathodic compound representing a reducible material. Upon application of electrical potential to the electrochromic medium 40 above a predetermined threshold, the anodic electrochromic compound oxidizes and the cathodic electrochromic compound simultaneously reduces. Such simultaneous oxidation and reduction results in a change in the absorption coefficient at least one wavelength in the visible spectrum when electrochemically activated. The combination of such anodic and cathodic electrochromic compounds in electrochromic medium 40 defines the color associated therewith upon application of electrical potential. Non-exclusive examples of such cathodic electrochromic compounds are those commonly referred to as viologen dyes, and non-exclusive examples of such anodic electrochromic compounds are those commonly referred to as phenazine dyes.

Electrochromic medium 40 may also include other materials such as solvents; antioxidants; thickeners; viscosity modifiers; light absorbers, light stabilizers, thermal stabilizers, that can reduce the degradation of the anionic and/or cationic compounds and/or electrochromic medium from light; and similar materials.

Figures 3A, 3B:
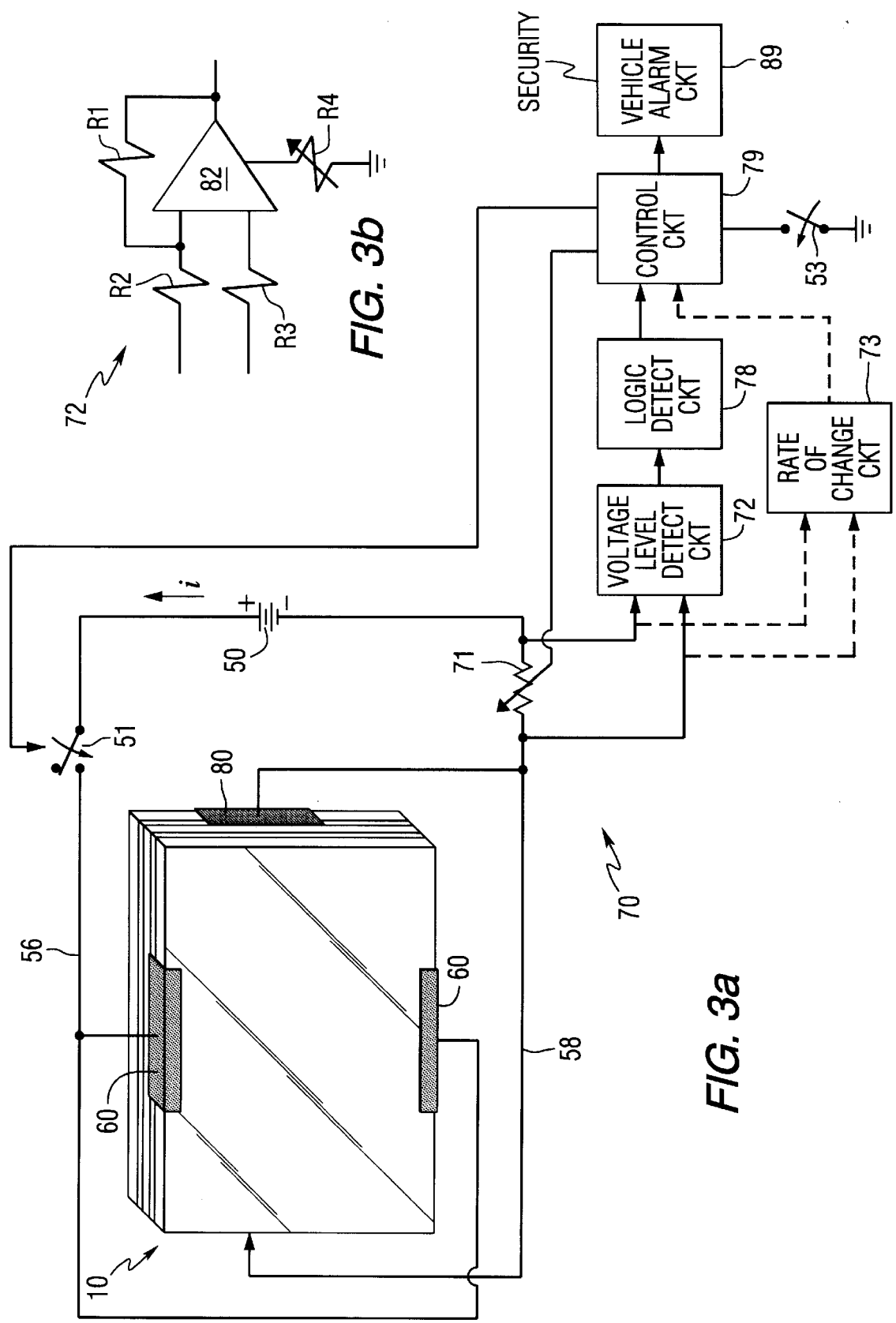

As seen in FIG. 3a, bus bars 60 are connected between first conductive coating 29 and a positive terminal of a power supply 50 by a lead 56, and bus bars 80 are connected between second conductive coating 39 and a negative terminal of power supply 50 by a lead 58. A switch 51 is provided in series with power supply 50 for selectively applying electrical power to electrochromic window assembly 10, with current i flowing through electrochromic window assembly 10 in the direction indicated. An external cover or insulator (not shown) may be provided about the perimeter of electrochromic window assembly 10.

Figure 2:
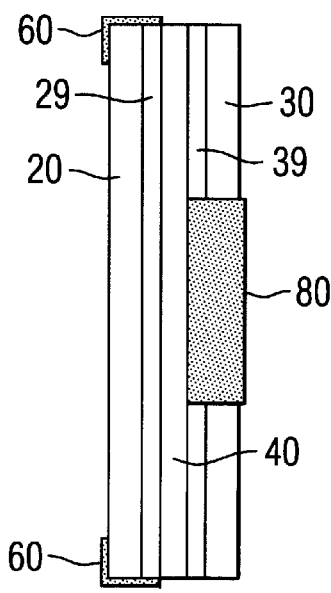
FIG. 2 is a side view of the electrochromic window assembly of FIG. 1.

In the particular assembly depicted in FIGS. 1–2, bus bars 60 are connected to opposite sides of first substrate 20, and bus bars 80 are connected to opposite ends of second substrate 30 for enabling electrical potential from power supply 50 to be applied between first conductive coating 29 and second conductive coating 39.

It is to be appreciated that any particular arrangement of bus bars 60 and 80 can be provided for electrochromic window assembly 10. For example, bus bars 60, 80 may extend perimetrically around the entire edge of first and second substrates 20 and 30, or may be spaced therearound. Moreover, the size and shape of bus bars 60 and 80 can be tailored to the particular geometry of electrochromic window assembly 10.

As indicated, electrochromic medium 40 is capable of variable transmittance upon application of an electrical potential thereto. Application of the electrical potential may be selective, such that electrochromic window assembly 10 can be selectively activated to vary the transmittance through electrochromic medium 40 by applying the electrical potential to cause the dye of electrochromic medium 40 to color. In this manner, electrochromic window assembly 10 can be adjusted between one level of transmittance when no electrical potential or electrical potential below a predetermined threshold is applied, and a second level of transmittance when electrical potential is applied above the predetermined threshold. The coloring of electrochromic medium 40 can be self-erasable, such that it automatically returns or erases to its colorless state when the electrical potential applied thereto decreases below the predetermined threshold level.

In a further embodiment, the electrochromic window assembly 10 is switchable and non-self-erasing, such that application of the electrical potential causes electrochromic medium 40 to color and remain in the colored state until the electrical potential is reversed.

Moreover, the color of electrochromic medium 40 may be of a constant color or shade upon application of an electrical potential, or may be of varying degrees of color or shade upon varying of the electrical potential. For example, varying the electrical potential applied to electrochromic medium 40 between a low electrical potential, e.g., 0.2 volts, and a high electrical potential, e.g., 1.2 volts, causes the color of the dye of electrochromic medium 40 to vary between a lighter color or shade and a darker color or shade. Preferably, electrochromic window assembly 10 is adjustable between a light transmittance value of about 90 percent to about one percent. As such, the light transmittance through electrochromic window assembly 10 can be adjusted as desired.

As shown in FIG. 3a, a security alarm 70 is provided for detecting an electrical characteristic of electrochromic window assembly 10. In this embodiment, security alarm 70 preferably includes a variable resistor 71 which is connected in series with power supply 50 and electrochromic window assembly 10 for detecting the flow of current i therethrough. Variable resistor 71 performs the dual function of enabling the voltage across electrochromic window assembly 10 to be adjusted and acts as a sensor resistor for security alarm 70. However, resistor 71 can be a fixed resistor and another variable resistor (not shown) can be included in series with resistor 71 for controlling the electrical potential applied across electrochromic window assembly 10.

A voltage level detect circuit 72 is connected to detect a voltage drop across resistor 71 due to current i flowing therethrough. Preferably, voltage level detect circuit 72 is configured to output to a logic detect circuit 78 a first voltage when the voltage across resistor 71 is above a predetermined voltage threshold level and to output to logic detect circuit 78 a second voltage when the voltage across resistor 71 is below the predetermined threshold voltage. Logic detect circuit 78 is configured to detect the voltage output by voltage level detect circuit 72 and to output to a control circuit 79 a signal which is in a first binary state when the output of voltage level detect 72 is the first voltage and which is in a second binary state when the output of the voltage level detect circuit 72 is the second voltage. Control circuit 79 has outputs connected to control the state of switch 51 and to control the resistance of variable resistor 71. A switch 53 is connected between an input of control circuit 79 and a reference voltage, such as ground, for selectively controlling when control circuit 79 is in an alarm state. More specifically, when switch 53 is in its open state, control circuit 79 is not responsive to the binary state of the signal output by logic detect circuit 78. When switch 53 is in its closed state, however, control circuit 79 enters an alarm state where control circuit 79 is responsive to the binary state of the signal output by logic detect circuit 78. When switch 53 is in its closed state and control circuit 79 detects that the signal output by logic detect circuit 78 is in the second binary state, control circuit 79 outputs to an alarm circuit 89 a signal which causes alarm circuit 89 to activate. In addition to or in lieu of alarm 89, a global positioning system (GPS) can be included (not shown in the Figure). These systems typically include receiver and/or transmitter and control module and at least one transmitting antenna with or without a receiving antenna. The GPS, which is most suitable for vehicles is adapted to actuate one or more signals for location and/or velocity and/or time parameters and to transmit one or more signals to earth satellite signaling systems. The antenna can be positioned exterior to the electrochromic device in a manner similar to the alarm 70. Any GPS system known to those skilled in the art can be used and basically actuate a signal from the signal sent to vehicle alarm 89.

Control circuit 79 can include an appropriate user interface (not shown) which enables a user to control the state of switch 51 and the resistance of resistor 71. Control circuit 79, switch 51, switch 53, and resistor 71 coact to effect three different modes of operation. In a first mode of operation, switch 53 is in its open state and control circuit 79, under the control of a user, causes switch 51 to be in its open state. With switch 53 in its open state, the alarm state of control circuit 79 is disabled and with switch 51 in its open state, electrochromic window assembly 10 is isolated from power supply 50, whereby no adjustment of the voltage across electrochromic window assembly 10 can occur. In a second mode of operation, control circuit 79 causes switch 51 to assume its closed state and switch 53 its open state. In this mode of operation, the coloration or shading of electrochromic window assembly 10 can be adjusted by adjustment of the resistance of resistor 71 via control circuit 79. However, the alarm state of control circuit 79 is disabled. In a third and final mode of operation, control circuit 79 causes switch 51 to assume its closed state and switch 53 is in its closed state. In this third mode of operation, the coloration or shading of electrochromic window assembly 10 can be controlled by adjustment of the resistance of variable resistor 71 via control circuit 79 and the alarm state of control circuit 79 is enabled.

With reference to FIG. 3b, and with ongoing reference to FIGS. 1–3a, preferably, voltage level detect circuit 72 includes an operational amplifier (op amp) 82 biased by fixed resistors R1, R2, and R3, and variable resistor R4. In operation, op amp 82, fixed resistors R1, R2, and R3, and variable resistor R4 coact so that op amp 82 outputs the first voltage when the voltage across resistor 71 is above the predetermined threshold voltage and outputs the second voltage when the voltage across resistor 71 is below the predetermined threshold voltage.

Preferably, the resistance of resistor 71 is variable between a first resistance and a second resistance. Such variable resistance permits regulation of the amount of voltage applied to electrochromic window assembly 10 to regulate the color thereof. Resistor 71 is preferably selected so that adjusting resistor 71 between the first resistance and the second resistance causes the color or shade of electrochromic medium 40 to change progressively between clear and a maximum desired color or shade.

The variable resistance of resistor 71 is also selected so that the voltage across electrochromic window assembly 10 does not exceed a breakdown voltage, e.g., 1.5 volts, of electrochromic medium 40. For example, the first resistance of resistor 71 can be selected so that in response to an applied potential by power supply 50 of, for example, 12 volts, the voltage across electrochromic window assembly 10 is 0.1 volts and the voltage across resistor 71 is 11.9 volts. The second resistance of resistor 71 can be selected so that the voltage across electrochromic window assembly 10 is, for example, 1.2 volts and the voltage across resistor 71 is 10.8 volts. More preferably, the first resistance and second resistance of resistor 71 are selected so that the voltage drop across electrochromic window assembly 10 is preferably variable between about 0.2 volts and about 0.6 volts, respectively.

As discussed above, voltage level detect circuit 72 detects when the voltage across resistor 71 is above or below the predetermined threshold voltage. The predetermined threshold voltage may be selected to be a fraction, e.g., one-tenth (1/10), of the voltage of power supply 50, for example, in automotive transparency applications, when the power supply is typically a 12 volt car battery.

In operation, voltage level detect circuit 72 will output the second voltage, indicative of little or no current flow through resistor 71 when switch 51 is open or when either first and/or second conductive coatings 29 and/or 39 are broken. In response to receiving the second voltage from voltage level detect circuit 72, logic detect circuit 78 changes its output signal to the second binary state. In response to control circuit 79 detecting the output signal of logic detect circuit 78 in the second binary state when switch 53 is in its closed state, control circuit 79 outputs to alarm circuit 89 the signal which causes alarm circuit 89 to activate.

More specifically, when switches 51 and 53 are in their closed states and a first and/or second conductive coating 29 and/or 39 is broken, the resistance of electrochromic window assembly 10 will increase and the current i under constant applied voltage of power supply 50 will decrease. In response to a decrease in current i therethrough, the voltage across resistor 71 will decrease accordingly. Thus, by detecting the voltage across resistor 71 and, especially a change in the voltage across resistor 71 between a voltage greater than the predetermined threshold voltage and a voltage less than the predetermined threshold voltage, a determination can be made regarding whether conductive coatings 29 and/or 39 are broken.

Alternatively, voltage level detect circuit 72 and logic detect circuit 78 can be omitted and replaced by a rate of change circuit 73, shown in phantom in FIG. 3a. Rate of change circuit 73 is configured to compare a rate of change of voltage across resistor 71 with a predetermined rate of change. Rate of change circuit 73 has an output connected to control circuit 79. The output of rate of change circuit 73 changes between a first binary state when the rate of change of voltage across resistor 71 is less than the predetermined rate of change, and a second binary state when the rate of change of voltage across resistor 71 is in excess of the predetermined rate of change.

In operation, if first and/or second coating 29 and/or 39 are broken, the path for current i through electrochromic window assembly 10 opens, with a corresponding rapid reduction in the voltage drop across resistor 71. Rate of change circuit 73 is configured to detect the drop in voltage across resistor 71 and to change its output from the first binary state to the second binary state if the rate of change of voltage across resistor 71 is in excess of the predetermined rate of change. In response to detecting the output of rate of change circuit 73 in the second binary state, control circuit 79 outputs to alarm circuit 89 the signal which causes alarm circuit 89 to activate.

The amount of voltage applied to electrochromic window assembly 10 can be selected based on the specific assembly and the specific electrochromic medium 40 used. Preferably, a voltage of between about 0.2–1.2 volts and, more preferably, between about 0.2–0.6 volts is required to cause the electrochromic medium 40 to switch from a clear state to a darkened state of reduced light transmittance.

By appropriate selection of adjustable resistor 71, security alarm 70 can be utilized to monitor for the breakage of first and/or second conductive coatings 29 and/or 39 when the electrochromic medium 40 is transparent or when the electrochromic medium is darkened. The selection of the variable resistance range of resistor 71 is based upon the resistance of electrochromic window assembly 10, the voltage of power supply 50, and the maximum potential that electrochromic medium 40 is configured to accept without adversely affecting its ability to darken. Thus, the potential of power supply 50 and the variable resistance range of resistor 71 are selected so that the voltage drop across electrochromic medium 40 does not exceed its maximum potential and, more preferably, the voltage across electrochromic window assembly 10 is variable within a predetermined range of voltages below its maximum potential in response to adjustment of variable resistor 71.

For example, electrochromic medium 40 may be transformed from a clear state to a state of reduced light transmittance by increasing the electrical potential across electrochromic window assembly 10 above 0.2 volts. At this voltage, the color of electrochromic medium 40 and, thus, electrochromic window assembly 10 achieves a state of reduced light transmittance. Similarly, the color of electrochromic medium 40 can be transformed from a state of reduced light transmittance to a clear state by decreasing the electrical potential across electrochromic window assembly 10 below 0.2 volts.

Figure 3C:
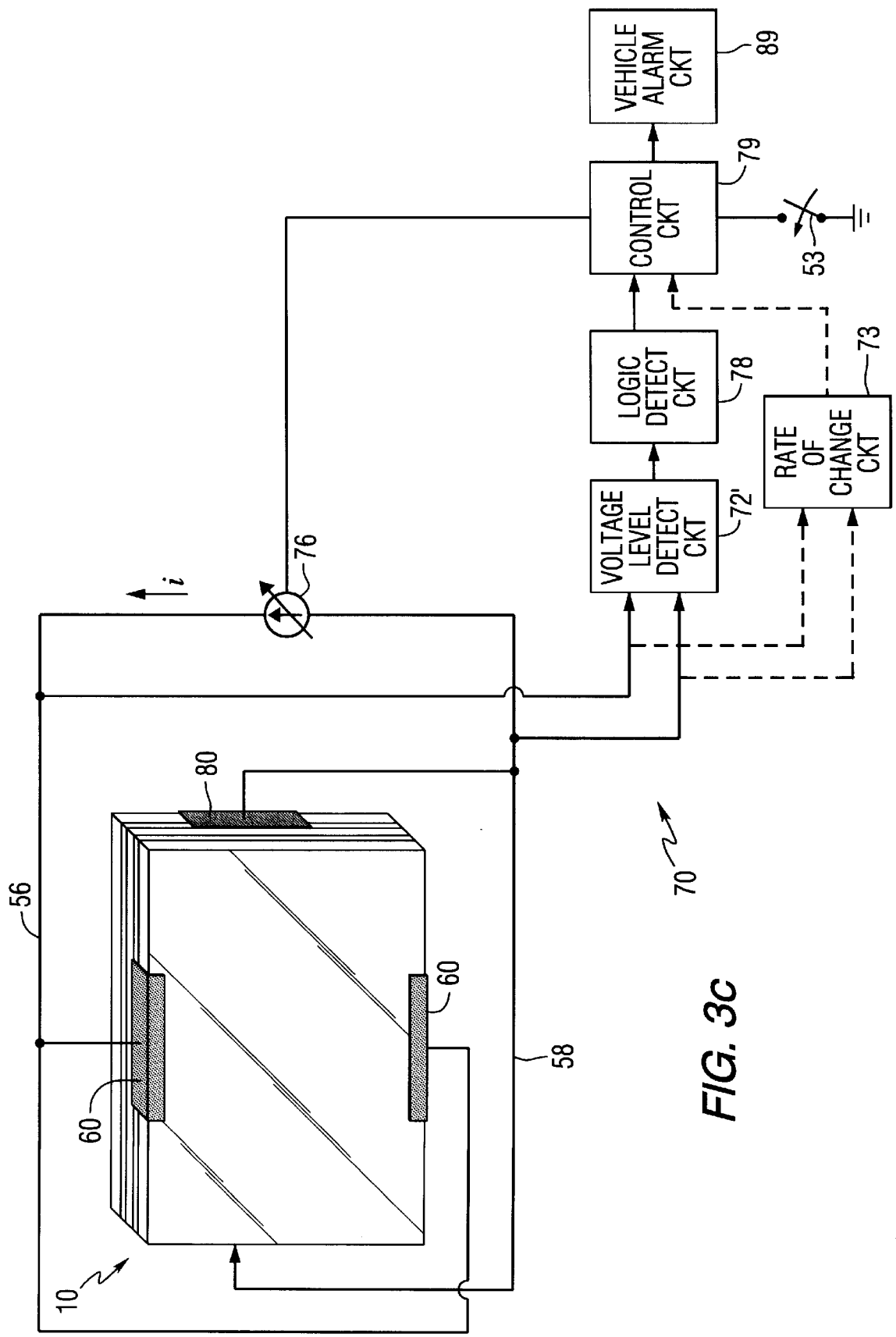
FIG. 3c is a schematic diagram of another embodiment of the electrochromic security window assembly of the present invention.
Figure 4:
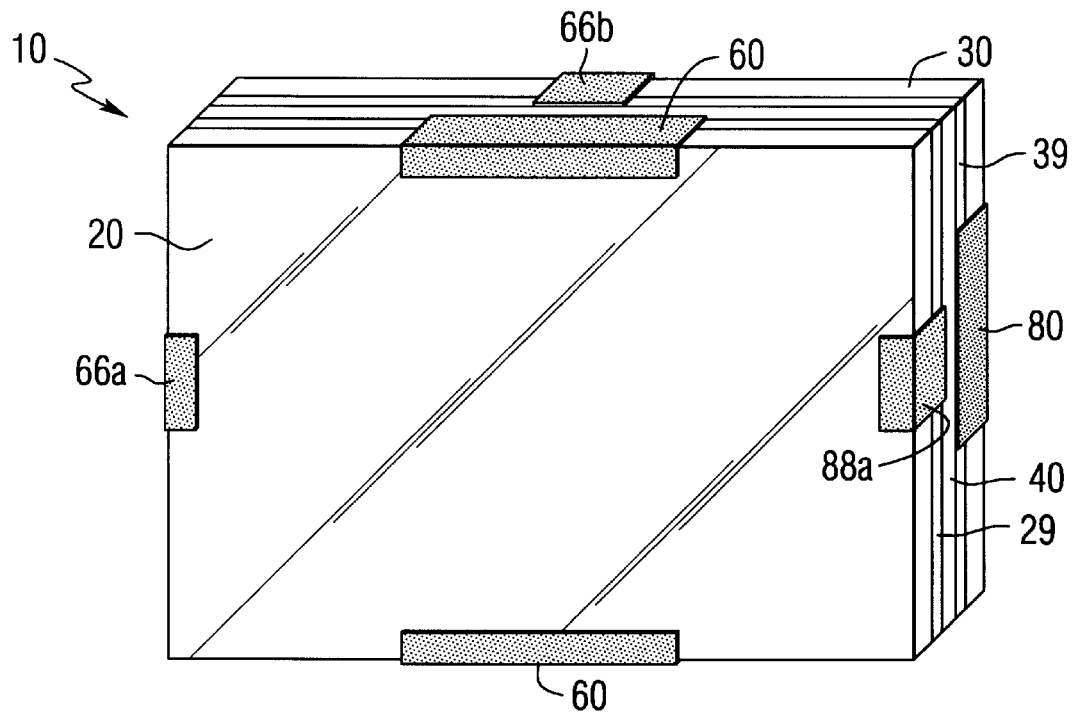
FIG. 4 is a perspective view of an electrochromic window assembly used in an alternate embodiment of the present invention.
Figure 5:
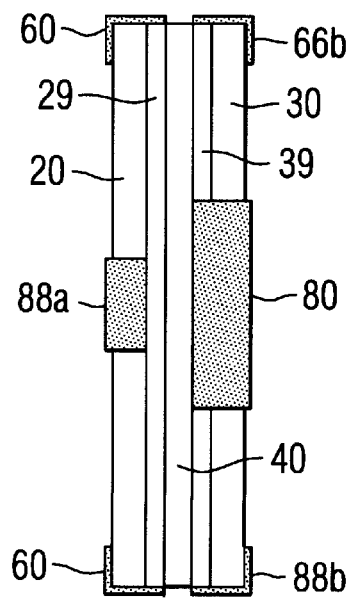
FIG. 5 is a side view of the electrochromic window assembly of FIG. 4.

In another embodiment shown in FIG. 3c, switch 51, and variable resistor 71 are omitted from the embodiment shown in FIG. 3a and power supply 50 is omitted and an adjustable current source 76 is substituted therefor. In this embodiment, control circuit 79 has an output connected to a control input of adjustable current source 76. Control circuit 79 includes the user interface (not shown) for enabling a user to control the current i output by adjustable current source 76. More specifically, by adjusting the controls of the user interface of control circuit 79, a user can progressively adjust the current i output by adjustable current source 76 between a first current and a second current. The current i flowing through electrochromic window assembly 10 produces thereacross a voltage corresponding to the resistance between bus bars 60 and 80. The resistance of electrochromic window assembly 10 is related to, among other things, the resistance of electrochromic medium 40, the resistance of first conductive coating 29, and the resistance of second conductive coating 39. By selectively controlling the current i therethrough, the voltage drop across electrochromic window assembly 10 can be controlled so that the color or shade of electrochromic medium 40 can be progressively changed between clear and a maximum desired color or shade.

In the embodiment shown in FIG. 3c, inputs of a voltage level detect circuit 72' are connected to detect the voltage drop across electrochromic window assembly 10. In operation, adjustable current source 76 is controlled by control circuit 79 to output current i which produces a voltage drop across electrochromic window assembly 10. Preferably, the minimum current i output by adjustable current source 76 will cause the voltage across electrochromic window assembly 10 to be greater than a lower predetermined threshold voltage and less than an upper predetermined threshold voltage of voltage level detect circuit 72.

In response to breakage of first and/or second conductive coatings 29, 39 the flow of current i through electrochromic window assembly 10 either increases or decreases depending upon the extent of breakage Specifically, if electrochromic window assembly 10 is broken such that current i will not flow therethrough, the voltage drop across electrochromic window assembly 10, and hence the power dissipated thereby, decreases to zero. To the contrary, if electrochromic window assembly 10 is broken so that the resistance thereof increases, the voltage drop across electrochromic window assembly 10 in response to current i flowing therethrough increases. To account for the possibility that the voltage across electrochromic window assembly 10 can increase or decrease in response to a breakage thereof, voltage level detect circuit 72' includes a pair of op amps 82 biased in the manner shown in FIG. 3b, with one op amp biased to detect the lower predetermined threshold voltage and with the other op amp biased to detect the upper predetermined threshold voltage (not shown in drawing). The outputs of the two op amps 82 are connected to the input of logic detect circuit 78. The output of the op amp to detect the lower predetermined threshold voltage outputs the second voltage to logic detect circuit 78 when the voltage drop across electrochromic window assembly 10 drops below the lower predetermined threshold voltage. In contrast, the op amp biased to detect the upper predetermined threshold voltage outputs the second voltage to logic detect circuit 78 when the voltage drop across electrochromic window assembly 10 exceeds the upper predetermined threshold voltage. Between the lower and upper predetermined threshold voltages, the two op amps 82 of voltage level detect circuit 72' output the first voltage to logic detect circuit 78. In response to receiving the second voltage from voltage level detect circuit 72', logic detect circuit 78 changes its output signal to the second binary state. In response to control circuit 79 detecting the output signal of logic detect circuit 78 in the second binary state when switch 53 is in its closed state, control circuit 79 outputs to alarm circuit 89 the signal which causes alarm circuit 89, e.g., a vehicle alarm, to activate.

When the alarm function of control circuit 79 is enabled in response to switch 53 being in its closed state, the current i through electrochromic window assembly 10 must be controlled so that the voltage drop across electrochromic window assembly 10 remains between the lower predetermined threshold voltage and the upper predetermined threshold voltage detectable by voltage level detect circuit 72'. In contrast, if the alarm function of control circuit 79 is disabled due to switch 53 being in its open state, the current i output by adjustable current source 76 can be reduced to 0 amps.

Alternatively, voltage level detect circuit 72' and logic detect circuit 78 can be omitted and rate of change circuit 73, shown in phantom in FIG. 3c, substituted therefor. Rate of change circuit 73 shown in FIG. 3c can be utilized in the manner discussed above in connection with rate of change circuit 73 shown in FIG. 3a to detect a rate of change of voltage access electrochromic window assembly 10.

With reference to FIGS. 4–6b, in another embodiment, electrochromic window assembly 10 includes bus bars 66a–66b and 88a–88b for independently monitoring the potential across first conductive coating 29 and second conductive coating 39, respectively, in connection with a security alarm 170.

First conductive coating 29 is provided with bus bar 66a and bus bar 88a at opposite ends of first substrate 20, while second conductive coating 39 is provided with bus bar 66b and bus bar 88b at opposite sides of second substrate 30. Bus bars 66a and 66b may be connected to the positive terminal of power supply 50 by leads 156a and 156b, respectively, while bus bars 88a and 88b may be connected to the negative terminal of power supply 50 by leads 158a and 158b, respectively.

Relay contacts are provided in the form of switches 51, 52a and 52b, for controlling application of voltage to electrochromic window assembly 10. Switch 51 is connected in series with bus bars 60 and 80 for controlling the application of voltage for adjusting electrochromic window assembly 10 between a clear state and a colored or shaded state. Switch 52a is connected in series with bus bar 66a, bus bar 88a, first conductive coating 29, power supply 50, and leads 156a and 158a. Switch 52b is connected in series with bus bar 66b, bus bar 88b, second conductive coating 39, power supply 50, and leads 156b and 158b.

It is contemplated that any particular arrangement of bus bars can be provided for the window assembly. For example, the bus bars may extend perimetrically around the entire edge of first and second substrates 20 and 30, or may be spaced therearound. Also, the size and shape of bus bars 66 and 88 can be tailored to the particular geometry of the electrochromic window assembly.

Bus bars 66a and 88a, in electrical contact with first conductive coating 29, and bus bars 66b and 88b, in electrical contact with second conductive coating 39, enable current flowing through first and second conductive coatings 29 and 39, respectively, to be independently monitored, as will be described in further detail, to determine breakage of either first conductive coating 29 or second conductive coating 39 apart from breakage of the electrochromic window assembly 10 as a whole.

Security alarm 170 is provided for detecting an electrical characteristic of electrochromic window assembly 10, and can include adjustable resistor 71 connected to control the potential applied across electrochromic medium 40 in the manner described above in connection with FIG. 3a. In the embodiment shown in FIG. 6a, however, adjustable resistor 71 is not part of security alarm 170. Rather, security alarm 170 includes reference resistor 171a connected in series with first conductive coating 29 and reference resistor 171b connected in series with second conductive coating 39. Switches 52a and 52b are connected in series with reference resistors 171a and 171b, respectively. A first voltage level detect circuit 172a is connected to detect the voltage across reference resistor 171a and a second voltage detect circuit 172b is connected to detect a voltage across reference resistor 171b.

Preferably, first and second voltage level detect circuits 172a and 172b have the same circuit configuration and operate in the same manner as voltage level detect circuit 72 shown in FIG. 3b. Specifically, voltage level detect circuit 172a compares the voltage across resistor reference 171a to a predetermined threshold voltage and outputs to a logic detect circuit 178 a first voltage when the voltage across reference resistor 171a is greater than the predetermined threshold voltage and outputs to logic detect circuit 178 a second voltage when the voltage across resistor reference 171a is below the predetermined threshold voltage. Voltage level detect circuit 172b operates in the same manner as voltage level detect circuit 172a to output a first voltage or a second voltage to logic detect circuit 178 as a function of the voltage across reference resistor 171b.

Logic detect circuit 178 has an output connected to an input of control circuit 179. A switch 153 is connected between control circuit 179 and a reference voltage, e.g., ground, for selectively controlling when control circuit 79 is in its alarm state. Specifically, when switch 153 is in its open state, the alarm state of control circuit 179 is disabled and control circuit 179 ignores the output of logic detect circuit 178. To the contrary, when switch 153 is in its closed state, control circuit 179 is in its alarm state where control circuit 179 detects the output of logic detect circuit 178.

The output of logic detect circuit 178 is in a first binary state in response to receiving the first voltages from voltage level detect circuits 172a and 172b. However, if either one or both of voltage level detect circuits 172a and 172b output a second voltage to logic detect circuit 178, the output of logic detect circuit 178 will be in a second binary state. In response to detecting that the output of logic detect circuit 178 is in the second binary state when control circuit 179 is in its alarm state, control circuit 179 outputs to alarm circuit 189 a signal which causes alarm circuit 189 to activate.

Figure 6A:
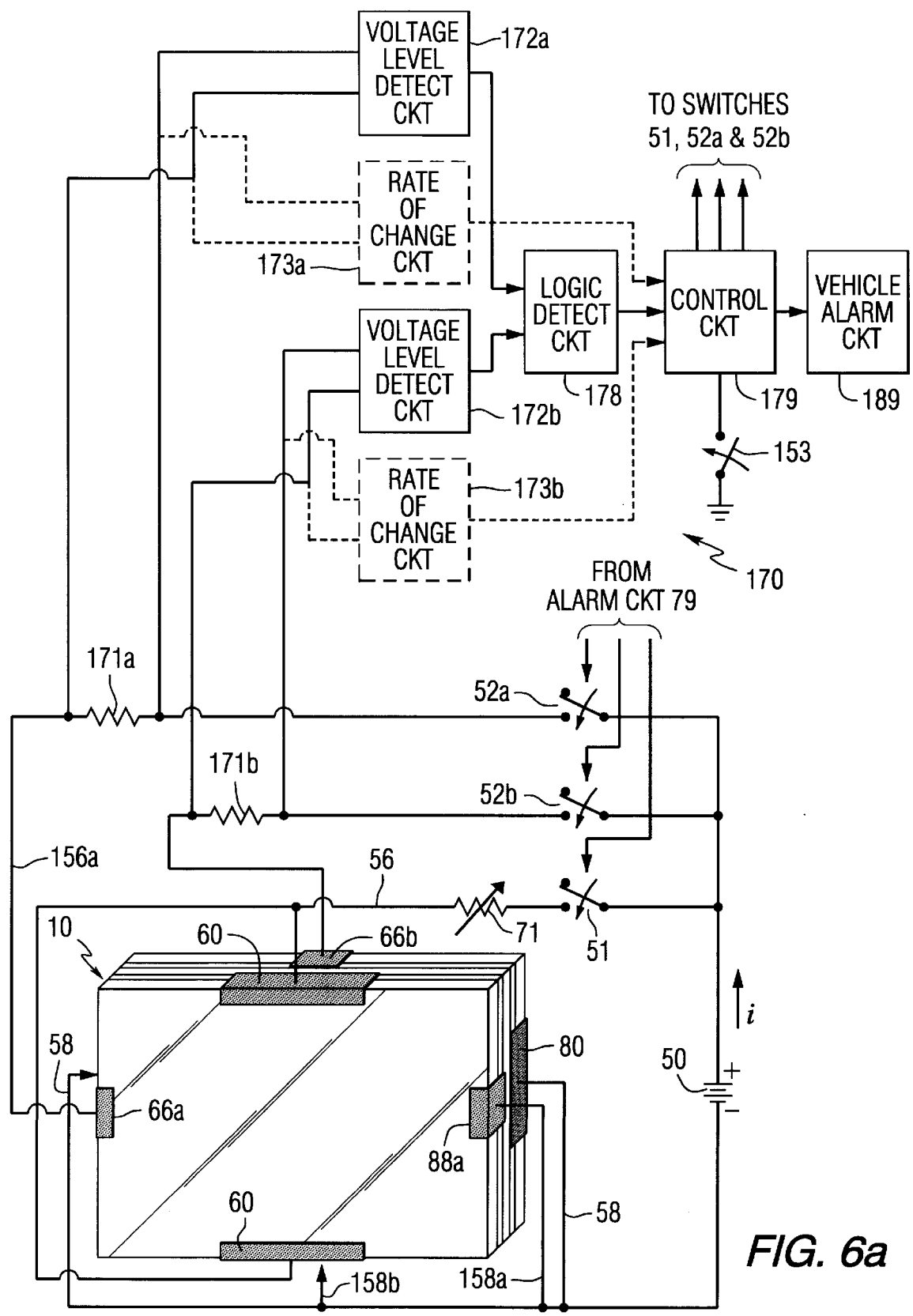
FIG. 6a is a schematic diagram of another embodiment of an electrochromic security window assembly of the present invention.

Alternatively, voltage level detect circuits 172a and 172b and logic detect circuit 178 can be omitted and rate of change circuits 173a and 173b, shown in phantom in FIG. 6a, can be connected to detect the voltage across reference resistors 171a and 171b, respectively. Rate of change circuit 173a is configured to compare the rate of change in the voltage across reference resistor 171a to a predetermined rate of change. If the rate of change of voltage across reference resistor 171a is less than the predetermined rate of change, the output of rate of change circuit 173a is in a first binary state. However, if the rate of change of voltage across reference resistor 171a is in excess of the predetermined rate of change, the output of rate of change circuit 173a changes to a second binary state. Similarly, the output of rate of change circuit 173b is in a first binary state when the rate of change of voltage across reference resistor 171b is less than the predetermined rate of change and is in a second binary state when the rate of change of voltage across reference resistor 171b is in excess of the predetermined rate of change. In response to detecting that the signal output by rate of change circuit 173a and/or rate of change circuit 173b is in the second binary state when control circuit 179 is in its alarm state, control circuit 179 outputs to alarm circuit 189 the signal which causes alarm circuit 189 to activate.

Preferably, security alarm 170 can be utilized when electrochromic window assembly 10 is connected to power supply 50 via resistor 71 and switch 51, or can be utilized when switch 51 is in its open state.

To avoid interference resulting from connecting resistors 71, 171a, and 171b in parallel when switches 51, 52a and 52b, respectively, are simultaneously in their closed states, control circuit 179 signals switch 51 to assume its open state before signaling switches 52a and 52b to assume their closed states. With switch 51 in its open state and with switches 52a and 52b in their closed states, control circuit 179 samples the output of logic detect circuit 178. If the output of logic detect circuit 178 is in the first binary state when control circuit 179 is in its alarm state, control circuit 179 does not signal alarm circuit 189 to activate. However, if the output of logic detect circuit 178 is in the second binary state when control circuit 179 is in its alarm state, control circuit 179 outputs to vehicle alarm circuit 189 the signal which causes alarm circuit 189 to activate. After sampling the output of logic detect circuit 178, control circuit 179 causes switches 52a and 52b to assume their open state before signaling switch 51 to assume its closed state.

Preferably, switch 51 remains in its open state for a brief interval when switches 52a and 52b transition between their closed and open states for sampling of voltages across reference resistors 171a and 171b. After the brief interval, switch 51 is caused to assume its closed state. The brief interval during which switch 51 is in its open state is selected so that the coloring or shading of electrochromic window assembly 10 is unaffected thereby. As will be appreciated, the duration of the brief interval will depend upon the specific electrochromic medium 40 of electrochromic window assembly 10, but can easily be accomplished within a time period of a few seconds or less. Preferably, control circuit 179 repeats the switch sequence shown in FIG. 7 periodically, e.g., one second every minute, to determine whether a breakage has occurred within first and/or second conductive coating 29 and/or 39.

An advantage of security alarm 170 is that the amount of voltage applied to effect a change of electrochromic medium 40 to a colored or shaded state may be of a different value as that applied to activate security alarm 170 to detect a change in current. For example, electrochromic medium 40 may be capable of transforming to a colored or shaded state of reduced light transmission upon application of, for example, 0.2 volts. At this potential, electrochromic medium 40 colors and electrochromic window assembly 10 achieves a state of reduced light transmittance. To operate security alarm 170 when electrochromic window assembly 10 is in its colored or shaded state, the switch sequence shown in FIG. 7 may be utilized with an applied voltage of, for example, 1.0 volts across each conductive coating 29 and 39 of electrochromic window assembly 10.

Figure 7:
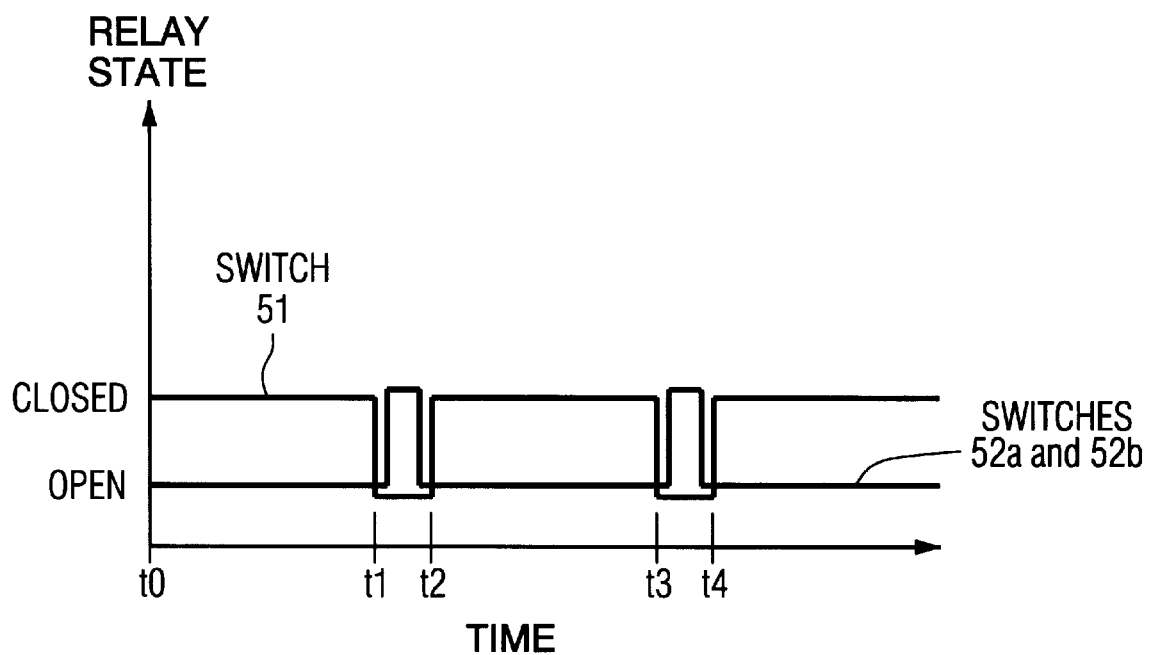
FIG. 7 is a graph of the state of the switches of FIGS. 6a and 6b.

It is to be appreciated that rate of change circuits 173a and 173b cannot be effectively utilized with the switch sequence shown in FIG. 7 because a rate of change across reference resistors 171a and/or 171b will not be detected unless such rate of change occurs when switches 52a and/or 52b are closed. Since switches 52a and/or 52b are closed for only a brief interval, if a breakage in conductive coating 29 and/or 39 were to occur during a time when switches 52a and 52b are open, rate of change circuits 173a and/or 173b would not detect any change in voltage. However, in the case where switch 51 is closed to provide power for changing the color of electrochromic medium 40 and switches 52a and 52b are closed to permit sensing of the resistances of first and second conductive coatings 29 and 39, respectively, rate of change circuits 173a and 173b can be used for detecting rates of change of voltage across reference resistors 171a and 171b in the manner described above.

Figure 6B:
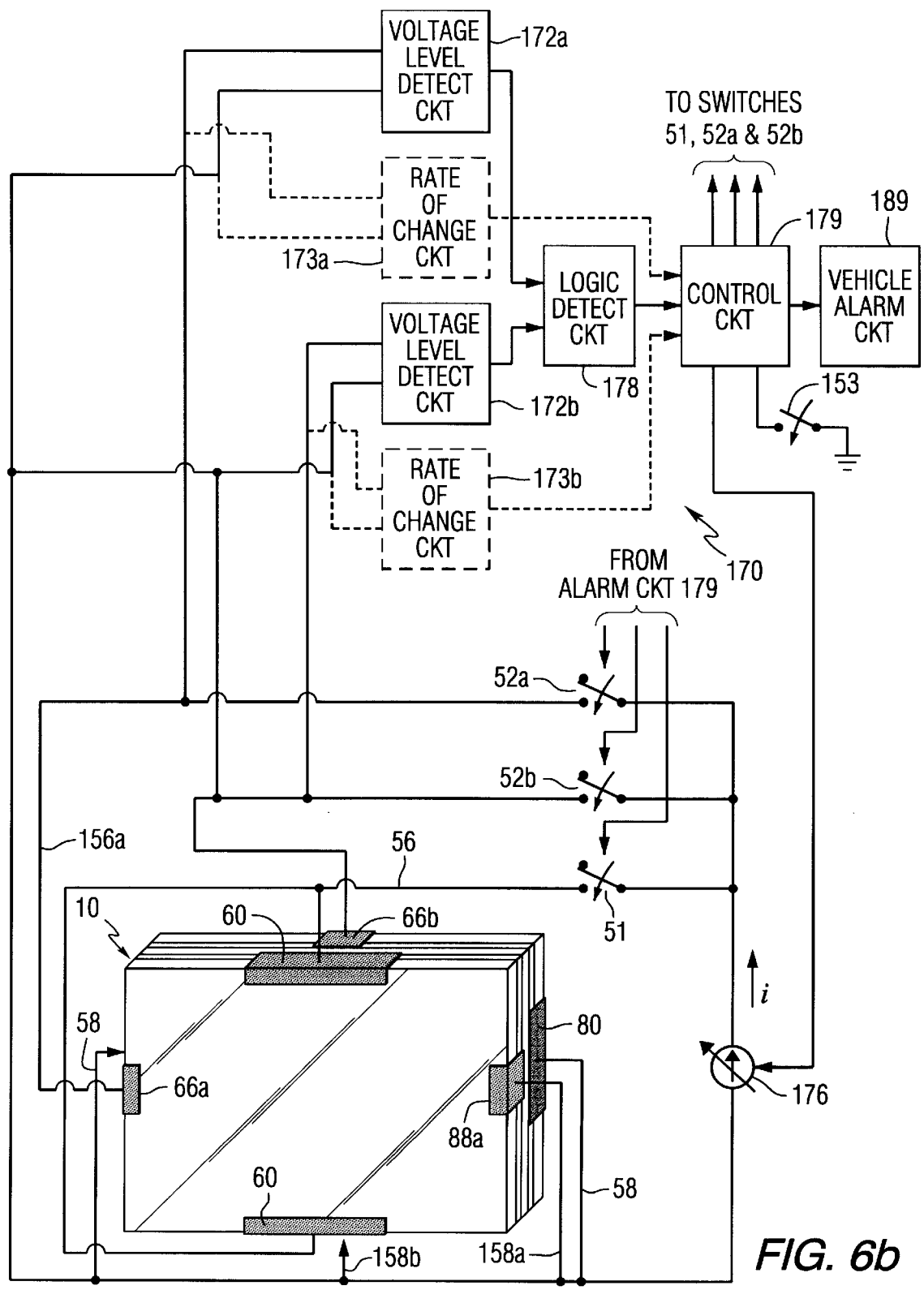
FIG. 6b is a schematic diagram of another embodiment of an electrochromic security window assembly of the present invention.

In the embodiment shown in FIG. 6b, resistors 71, 171a and 171b can be omitted and power supply 50 can be replaced with an adjustable current source 176 connected to be controlled by control circuit 179. In this embodiment, voltage level detect circuits 172a and 172b are connected to detect the voltage across conductive coatings 29 and 39, respectively. Preferably, control circuit 179 controls switches 51, 52a, and 52b so that switch 51 is not closed at the same time switch 52a or 52b are closed. Moreover, control circuit 179 controls the current i output by adjustable current source 176 as a function of the closed state of switch 51 and the closed states of switches 52a and 52b. Specifically, when control circuit 179 causes switch 51 to assume its closed state, control circuit 179 controls the current i output by adjustable current source 176 to correspond to user selection thereof at the user interface of control circuit 179. To measure the voltage drop across conductive coatings 29 and 39, control circuit 179 causes switch 51 to assume its open state for a brief interval when switches 52a and 52b are transitioned between their closed states and opened states. If necessary for accurate measurement of conductive coatings 29 and 39, control circuit 179 adjusts the current i output by adjustable current source 176 to produce a voltage drop across conductive coatings 29 and 39 within the predetermined threshold voltages of voltage detect circuits 172a' and 172b'. More specifically, voltage detect circuits 172a' and 172b' each operate in the same manner as voltage detect circuit 72' shown in FIG. 3b, to compare the voltage across first and second conductive coatings 29 and 39, respectively, to a lower threshold voltage level and an upper threshold voltage level.

When the alarm state of control circuit 179 is active during the brief interval when switches 52a and 52b are in their closed states, control circuit 179 samples the output of logic detect circuit 178. In response to detecting that the output of logic detect circuit 178 is in the second binary state, control circuit 179 outputs to alarm circuit 189 the signal which causes alarm circuit 189 to activate. Thereafter, control circuit 179 causes switches 52a and 52b to assume their open state and thereafter causes switch 51 to assume its closed state.

Alternatively, voltage level detect circuits 172a and 172b and logic detect circuit 178 can be omitted and rate of change circuits 173a and 173b shown in phantom in FIG. 6b can be connected to detect the voltage across conductive coatings 29 and 39, respectively. Rate of change circuits 173a and 173b can be operated in the manner discussed above in connection with FIG. 6a to detect the rate of change of voltage across conductive coatings 29 and 39, respectively, when switches 52a and 52b are in their closed states and control circuit 179 is in its alarm state.

In the embodiment shown in FIG. 3a, variable resistor 71 is used to adjust the voltage applied across electrochromic window assembly 10 and to provide a means for security alarm 70 to detect a breakage of one or both of first conductive coating 29 and second conductive coating 39. Instead of being variable, however, resistor 71 can be a fixed resistor and other means can be utilized to control the voltages applied to electrochromic window assembly 10 and resistor 71. For example, another adjustable resistor can be included in series between power supply 50 and electrochromic window assembly 10 for controlling the flow of current i therethrough. Moreover, power supply 50 can be an adjustable voltage source which derives its operating power from another power source, such as a vehicle battery. Similarly, in the embodiment shown in FIG. 6a, variable resistor 71 can be made a fixed resistor and another variable resistor can be connected in series with bus bars 60 and 80. Alternatively, power supply 50 can be an adjustable voltage source which derives its power from the another power source.

The voltage level detect circuits, the logic detect circuits, the control circuits, the alarm circuits, and the rate of change circuits discussed above are comprised of electrical components and/or integrated circuitry known to those skilled in the art for the accomplishment of the functions described for each herein.

The invention being thus described will be apparent to the skilled artisan that the same may be varied in many ways. For example, while the invention has been described in terms of one embodiment involving automotive transparencies, it will be understood by those skilled in the art that the invention is also useful in connection with architectural glazings, which can be easily accomplished through a DC current source or DC voltage source, which obtains its power from an AC power source. Such variations are not to be regarded as a departure from the spirit and scope of the invention and all such modifications are intended to be included within the scope of the following claims.

We claim:

1. An electrochromic security window assembly comprising:

first and second spaced transparent substrates defining a chamber therebetween, the first and the second substrates including first and second conductive coatings on respective facing surfaces thereof;

an electrochromic medium contained in the chamber comprising at least one anodic electrochromic compound and at least one cathodic electrochromic compound and having reduced light transmittance upon application of electrical activation between the first and second conductive coatings above a reduction potential capable of simultaneously oxidizing the anodic electrochromic compound and reducing the cathodic compound;

means for applying an electrical potential across the electrochromic medium comprising a voltage source connected in series with the first conductive coating, the second conductive coating and the electrochromic medium; and means for detecting a change in an electrical characteristic of at least one of the first and second conductive coatings and for generating an output signal in response to a change in the electrical characteristic corresponding to a break in the at least one conductive coating comprising a first sensing element connected in series with the first conductive coating and the voltage source, and circuitry for detecting an electrical condition of the first sensing element corresponding to a flow of current through the first conductive coating, for producing the output signal as a function of the detected electrical condition of the first sensing element, for comparing the output signal to a predetermined electrical condition, and for activating an alarm when the output signal is greater than or less than the predetermined electrical condition.

2. An electrochromic security window assembly as in claim 1, wherein:

the means for detecting further includes a second sensing element connected in series with the second conductive coating and the voltage source; and the circuitry for detecting detects an electrical condition of the second sensing element corresponding to a flow of current through the second conductive coating and produces the output signal as a function of the detected electrical condition of the second sensing element.

3. An electrochromic security window assembly as in claim 1, further including a means for switching which alternately connects the voltage source in series with (i) the first conductive coating, the second conductive coating and the electrochromic medium, and (ii) the first sensing element and the first conductive coating.

4. An electrochromic security window assembly as in claim 3, wherein the means for switching includes at least one switch.

5. An electrochromic security window assembly comprising:
first and second spaced transparent substrates defining a chamber therebetween, the first and the second substrates including first and second conductive coatings on respective facing surfaces thereof;
an electrochromic medium contained in the chamber comprising at least one anodic electrochromic compound and at least one cathodic electrochromic compound and having reduced light transmittance upon application of electrical activation between the first and second conductive coatings above a reduction potential capable of simultaneously oxidizing the anodic electrochromic compound and reducing the cathodic compound;
means for applying an electrical potential across the electrochromic medium comprising a current source configured to be connected in series with (i) the first conductive coating, the second conductive coating and the electrochromic medium, and (ii) the first conductive coating; and
means for detecting a change in an electrical characteristic of at least one of the first and second conductive coatings and for generating an output signal in response to a change in the electrical characteristic corresponding to a break in the at least one conductive coating comprising circuitry for detecting an electrical condition of the first conductive coating corresponding to a flow of current from the current source therethrough, for producing the output signal as a function of the detected electrical condition of the first conductive coating, for comparing the output signal to a predetermined electrical condition, and for activating an alarm when the output signal is greater than or less than the predetermined electrical condition.

6. An electrochromic security window assembly as in claim 5, wherein the circuitry for detecting detects an electrical condition of the second conductive coating corresponding to a flow of current from the current source therethrough and produces the output signal as a function of the detected electrical condition of the second conductive coating.

7. An electrochromic security window assembly as in claim 5, further including a means for switching which alternately connects the current source in series with (i) the first conductive coating, the second conductive coating and the electrochromic medium, and (ii) the first conductive coating.

8. An electrochromic security window assembly as in claim 7, wherein the means for switching includes at least one switch.

9. An electrochromic security window assembly comprising:
first and second spaced transparent substrates defining a chamber therebetween, the first and the second substrates including first and second conductive coatings on respective facing surfaces thereof;
an electrochromic medium contained in the chamber comprising at least one anodic electrochromic compound and at least one cathodic electrochromic compound and having reduced light transmittance upon application of electrical activation between the first and second conductive coatings above a reduction potential capable of simultaneously oxidizing the anodic electrochromic compound and reducing the cathodic compound;
a power supply configured to produce an electrical potential across the electrochromic medium; and
means for detecting a change in an electrical characteristic of at least one of the first and second conductive coatings and for generating an output signal in response to a change in the electrical characteristic corresponding to a break in the at least one conductive coating.

10. An electrochromic security window assembly as in claim 9, wherein the power supply is a voltage source or a current source.

11. An electrochromic security window assembly as in claim 9, wherein the means for detecting detects a change in an electric current through the at least one conductive coating.

12. An electrochromic security window assembly as in claim 11, wherein the means for detecting is a resistor connected in series with the at least one conductive coating.

13. An electrochromic security window assembly as in claim 9, wherein the first and second transparent substrates are selected from the group consisting of glass and polymeric materials.

14. An electrochromic security window assembly as in claim 13, wherein the glass is float glass.

15. An electrochromic security window assembly as in claim 9, wherein the first and the second substrates are glass, and further comprising a transparent polymeric layer.

16. An electrochromic security window assembly as in claim 15, wherein the transparent polymeric layer is laminated to an outer surface of the first transparent substrate.

17. An electrochromic security window assembly as in claim 15, further comprising a glass outer substrate, the transparent polymeric layer laminated between the glass outer substrate and the outer surface of the first transparent substrate.

18. An electrochromic security window assembly as in claim 9, wherein the cathodic electrochromic compound is a viologen compound and the anodic electrochromic compound is a phenazine compound.

19. An electrochromic security window assembly as in claim 9, wherein the electrochromic window assembly is selected from the group consisting of automotive windshields, automotive side windows, automotive rear windows, automotive sunroofs, architectural glazings, architectural windows, and architectural skylights.

20. An electrochromic security window assembly comprising:
first and second spaced transparent substrates defining a chamber therebetween, the first and the second substrates including first and second conductive coatings on respective facing surfaces thereof;
an electrochromic medium contained in the chamber comprising at least one anodic electrochromic compound and at least one cathodic electrochromic compound and having reduced light transmittance upon application of electrical activation between the first and second conductive coatings above a reduction potential capable of simultaneously oxidizing the anodic electrochromic compound and reducing the cathodic compound;
means for applying an electrical potential across the electrochromic medium; and
means for detecting a change in an electrical characteristic of at least one of the first and second conductive coatings and for generating an output signal in response to a change in the electrical characteristic corresponding to a break in the at least one conductive coating, comprising a sensing element connected for detecting a flow of current through the electrochromic medium, and circuitry for detecting an electrical condition of the sensing element corresponding to the flow of current through the electrochromic medium, for producing the output signal indicative of the electrical condition, for comparing the output signal to a predetermined electrical condition, and for activating an alarm when the output signal is greater than or less than the predetermined electrical condition.

21. An electrochromic security window assembly as in claim 20, wherein the sensing element is a resistor.

22. An electrochromic security window assembly comprising:

first and second spaced transparent substrates defining a chamber therebetween, the first and the second substrates including first and second conductive coatings on respective facing surfaces thereof;

an electrochromic medium contained in the chamber comprising at least one anodic electrochromic compound and at least one cathodic electrochromic compound and having reduced light transmittance upon application of electrical activation between the first and second conductive coatings above a reduction potential capable of simultaneously oxidizing the anodic electrochromic compound and reducing the cathodic compound;

means for applying an electrical potential across the electrochromic medium; and means for detecting a change in an electrical characteristic of at least one of the first and second conductive coatings and for generating an output signal in response to a change in the electrical characteristic corresponding to a break in the at least one conductive coating comprising circuitry for detecting an electrical condition corresponding to a flow of current through the electrochromic medium, for producing the output signal indicative of the electrical condition, for comparing the output signal to a predetermined electrical condition, and for activating an alarm when the output signal is greater than or less than the predetermined electrical condition.

23. An electrochromic security window assembly comprising:

first and second spaced transparent substrates defining a chamber therebetween, the first and the second substrates including first and second conductive coatings on respective facing surfaces thereof;

an electrochromic medium contained in the chamber comprising at least one anodic electrochromic compound and at least one cathodic electrochromic compound and having reduced light transmittance upon application of electrical activation between the first and second conductive coatings above a reduction potential capable of simultaneously oxidizing the anodic electrochromic compound and reducing the cathodic compound;

means for applying an electrical potential across the electrochromic medium, wherein the electrical potential applied to the at least one conductive coating is adjustable between a voltage below the reduction potential capable of simultaneously oxidizing the anodic electrochromic compound and reducing the cathodic electrochromic compound when the window assembly is in a state of increased light transmittance and a voltage above the reduction potential capable of simultaneously oxidizing the anodic electrochromic compound and reducing the cathodic electrochromic compound when the window assembly is in a state of reduced light transmittance and vice versa; and means for detecting a change in an electrical characteristic of at least one of the first and second conductive coatings and for generating an output signal in response to a change in the electrical characteristic corresponding to a break in the at least one conductive coating.

24. An electrochromic security window assembly comprising:

first and second spaced transparent substrates defining a chamber therebetween, the first and the second substrates including first and second conductive coatings on respective facing surfaces thereof;

an electrochromic medium contained in the chamber comprising at least one anodic electrochromic compound and at least one cathodic electrochromic compound and having reduced light transmittance upon application of electrical activation between the first and second conductive coatings above a reduction potential capable of simultaneously oxidizing the anodic electrochromic compound and reducing the cathodic compound;

means for alternately applying the electrical potential across the electrochromic medium: (i) across the first and second conductive coatings at a voltage above the reduction potential capable of simultaneously oxidizing the anodic electrochromic compound and reducing the cathodic electrochromic compound when the window assembly is in a state of reduced light transmittance; and (ii) to the at least one conductive coating at a voltage capable of detecting a change in the electrical characteristic; and means for detecting a change in an electrical characteristic of at least one of the first and second conductive coatings and for generating an output signal in response to a change in the electrical characteristic corresponding to a break in the at least one conductive coating.

25. A method for monitoring penetration of a window assembly capable of variable light transmittance comprising:

a) providing an electrochromic security window assembly comprising:
 (i) first and second spaced transparent substrates defining a chamber therebetween, the first and the second substrates including first and second conductive coatings on respective facing surfaces thereof; and
 (ii) an electrochromic medium contained within the chamber comprising at least one anodic electrochromic compound and at least one cathodic electrochromic compound and having reduced light transmittance upon application of electrical potential between the first and second conductive coatings above a reduction potential capable of simultaneously oxidizing the anodic electrochromic compound and reducing the cathodic compound;

b) alternately applying the electrical potential to (i) the first conductive coating, the electrochromic medium and the second conductive coating connected in series and (ii) the at least one of the first and second conductive coating;

c) monitoring for a change in an electrical characteristic of the at least one of the first and second conductive coatings having the electrical potential applied thereto; and d) generating an output signal upon the change in the electrical characteristic.

26. A method as in claim 25, wherein the first and second conductive coatings are connected in parallel.

27. A method as in claim 25, wherein:

step (b) includes applying the electrical potential to the first conductive coating, the electrochromic medium and the second conductive coating connected in series; and step (c) includes monitoring for a change in the current through the electrochromic medium.

28. A method for monitoring penetration of a window assembly capable of variable light transmittance comprising:

a) providing an electrochromic security window assembly comprising:
  (i) first and second spaced transparent substrates defining a chamber therebetween, the first and the second substrates including first and second conductive coatings on respective facing surfaces thereof; and
  (ii) an electrochromic medium contained within the chamber comprising at least one anodic electrochromic compound and at least one cathodic electrochromic compound and having reduced light transmittance upon application of electrical potential between the first and second conductive coatings above a reduction potential capable of simultaneously oxidizing the anodic electrochromic compound and reducing the cathodic compound;

b) applying an electrical potential to at least one of the first and second conductive coatings, wherein the electrical potential applied to the first and second conductive coatings is adjustable between a voltage above the reduction potential capable of simultaneously oxidizing the anodic electrochromic compound and reducing the cathodic electrochromic compound when the window assembly is in a state of reduced light transmittance and a voltage below the reduction potential capable of simultaneously oxidizing the anodic electrochromic compound and reducing the cathodic electrochromic compound to intermittently monitor for a change in the electrical characteristic of the at least one of the first and second conductive coatings and vice versa;

c) monitoring for a change in an electrical characteristic of the at least one of the first and second conductive coatings having the electrical potential applied thereto; and d) generating an output signal upon the change in the electrical characteristic.

29. A method as in claim 28, wherein step (c) includes monitoring for a change in current through the first conductive coating and/or the second conductive coating.

30. A method as in claim 28, wherein the output signal activates an alarm.

31. A method as in claim 28, wherein the first and second transparent substrates are selected from the group consisting of glass and polymeric materials.

32. A method as in claim 28, wherein the electrochromic window assembly is selected from the group consisting of automotive windshields, automotive side windows, automotive rear windows, automotive sunroofs, architectural glazings, architectural windows, and architectural skylights.

* * * * *